United States Patent [19]

Iwadare et al.

[11] Patent Number: 5,875,424
[45] Date of Patent: Feb. 23, 1999

[54] ENCODING SYSTEM AND DECODING SYSTEM FOR AUDIO SIGNALS INCLUDING PULSE QUANTIZATION

[75] Inventors: Masahiro Iwadare; Yuichiro Takamizawa, both of Tokyo, Japan

[73] Assignee: NEC Corporation, Japan

[21] Appl. No.: 780,970

[22] Filed: Jan. 9, 1997

[30] Foreign Application Priority Data

Jan. 10, 1996 [JP] Japan ................................. 8-001881

[51] Int. Cl.$^6$ ....................................................... G10L 5/00
[52] U.S. Cl. ........................... 704/230; 704/220; 704/219
[58] Field of Search ..................................... 704/500, 501, 704/201, 229, 230

[56] References Cited

U.S. PATENT DOCUMENTS 5,369,724 11/1994 Lim .
5,490,130 2/1996 Akagiri .................................... 369/124

FOREIGN PATENT DOCUMENTS 30775 1/1989 European Pat. Off. .

OTHER PUBLICATIONS

Pan, "an Overview of the MPEG/Audio Compression Algorithm", *Proceedings of the SPIE*, vol. 2187:260–273 (1994).

"Information Technology—Coding of Moving Pictures and Associated Audio for Digital Storage Media At Up to About 1,5 Mbits/s", ISO/IEC (International Organization for Standardization/International Electro–Technical Commission) 11172–3: 1993, pp. i–vi and 1–151.

*Primary Examiner*—David R. Hudspeth
*Assistant Examiner*—Harold Zintel
*Attorney, Agent, or Firm*—Ostrolenik, Faber, Gerb Soffen, LLP

[57] ABSTRACT

An encoding system is disclosed, which includes an input terminal for receiving an input signal, a signal converting portion for converting the input signal into frequency-domain signals and grouping several frequency-domain signals into blocks, an analyzing portion for analyzing the input signal and the frequency-domain signals and obtaining an allowable error, a selecting portion for selecting one of a plurality of quantizing portions that quantizes frequency-domain signals of each block corresponding to the allowable error, a plurality of quantizing portions for quantizing frequency-domain signals corresponding to selection information and calculating amplitude information and codes, at least one pulse quantizing portion for encoding only part of the frequency domain signals, a multiplexing portion for multiplexing the amplitude information, codes, and selection information, and an output terminal for outputting the multiplexed signal.

16 Claims, 4 Drawing Sheets

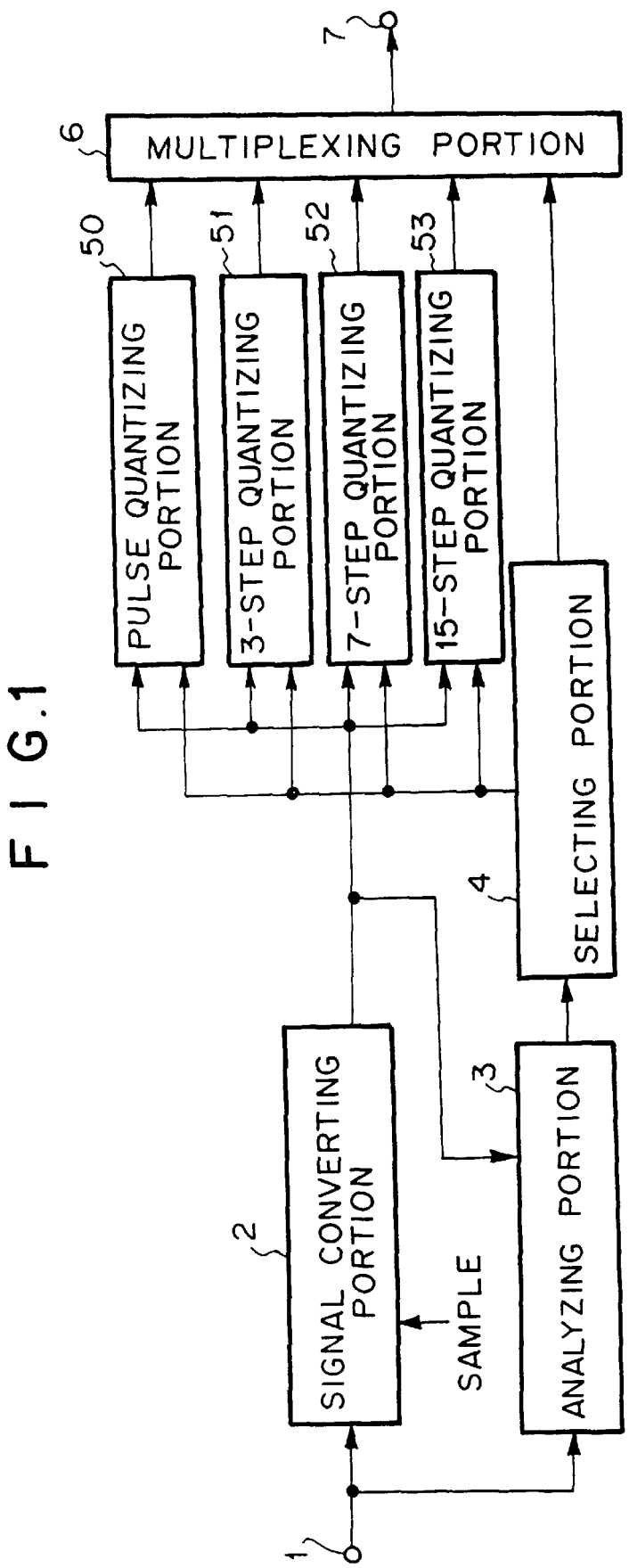
F I G. 1

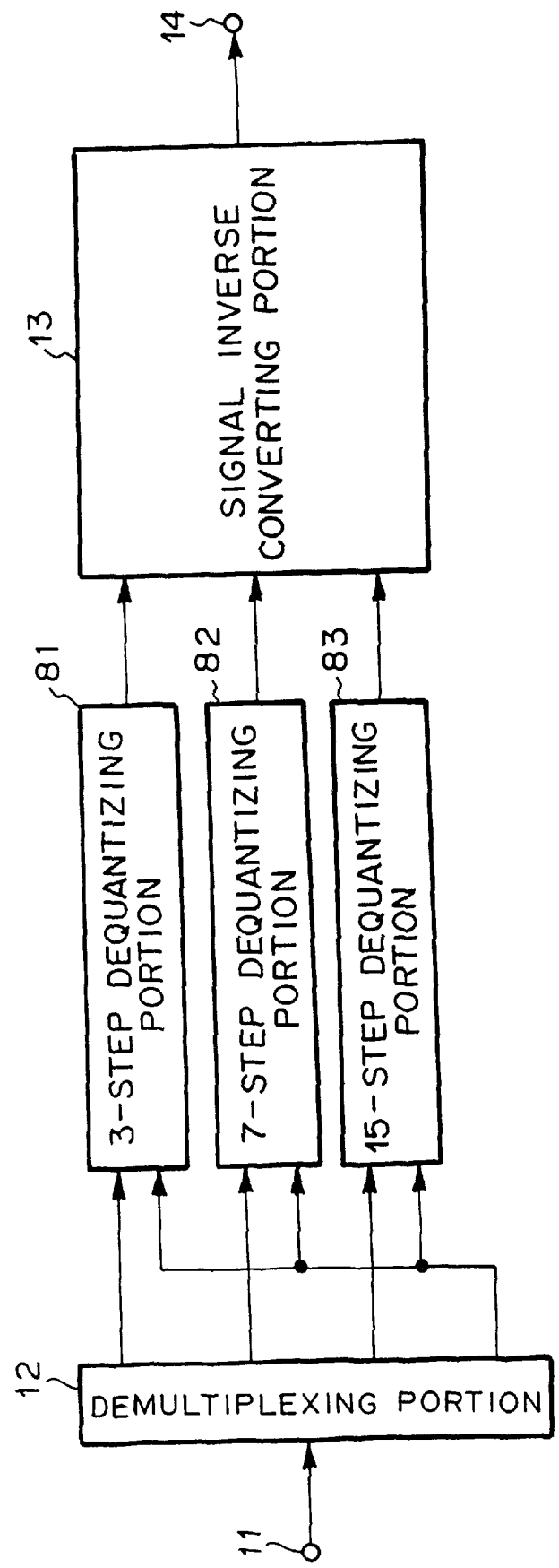

ENCODING SYSTEM AND DECODING SYSTEM FOR AUDIO SIGNALS INCLUDING PULSE QUANTIZATION

BACKGROUND OF THE INVENTION

1. Field of the Invention

The present invention relates to a system for effectively encoding and decoding a speech signal, an audio signal, and so forth.

2. Description of the Related Art

In a digital encoding system for a speech signal, an audio signal, and so forth, the signal transmission or recording rate is decreased by removing redundancy in the signal. An encoding system, referred to as MPEG/Audio Layer I, as defined in a related art reference, ISO/IEC (International Organisation for Standardisation/International Electrotechnical Commission) 11172-3, will be described with reference to FIGS. 3 and 4.

A conventional encoder shown in FIG. 3 is composed of an input terminal 1, a signal converting portion 2, an analyzing portion 3, a selecting portion 4, quantizing portions 51 to 53, a multiplexing portion 6, and an output terminal 7. The quantizing portions 51 to 53 differ from each other in the number of quantization steps. In this example, the quantizing portion 51 has three quantization steps. The quantizing portion 52 has seven quantization steps. The quantizing portion 53 has 15 quantization steps. Quantizing portions with more steps than 15 steps are provided in the related art reference, but are omitted in this document for simplification.

This system is based on a sub-band encoding system where an input signal is divided into a plurality of frequency-domain signals, and each frequency-domain signal is independently encoded. Generally, speech and audio signals have larger amplitudes at lower frequencies, the necessary rate to transmit can be decreased by assigning more bits at lower frequency and fewer bits at higher frequency.

In practice, a digitized audio signal, for example, PCM audio samples, is supplied from the input terminal 1. Whenever 32 samples of an audio signal are input into the encoder, the signal converting portion 2 divides the input audio signal into frequency bands and converts the signals into 32 frequency-domain samples. Also the signal converting portion 2 stores 12 sets of frequency-domain signals in a buffer thereof, wherein a set of frequency-domain signals is the 32 frequency-domain samples obtained by one conversion. The 12 sets of frequency-domain signals of each frequency are referred to as one block (32×12=384 samples/frame).

The analyzing portion 3 calculates an allowable error at each frequency band in quantizing the frequency-domain signals. For example, when an objective signal to noise (S/N) ratio is used in evaluating the coding quality, the allowable error is kept constant for each frequency-domain signal. When an audio signal is encoded, not only an objective value such as S/N ratio, but a subjective evaluation such as by test listening is high considered. Thus, the encoding of noise may be controlled using a psychoacoustical analysis technology so that the deterioration of the listening quality of the reproduced sound is minimized. Consequently, based on at least one of the input audio signal and the frequency-domain signals, the allowable error should be obtained.

The selecting portion 4 selects one of the quantizing portions 51 to 53 that quantizes frequency-domain signals for each block.

Each of the quantizing portions 51 to 53 receives a block of frequency-domain signals, calculates amplitude information for the frequency-domain signals of each block, encodes the frequency-domain signals with the amplitude information, and outputs the amplitude information and codes of the encoded frequency-domain signals. The amplitude information is obtained up to a value of 2 dB as shown in Table 1.

TABLE 1

| Relation between amplitude index and amplitude | |
|---|---|
| Amplitude Index | Amplitude |
| 0 | 2.0 |
| 1 | 1.587 |
| 2 | 1.260 |
| 3 | 1.0 |
| 4 | 0.794 |
| 5 | 0.630 |
| 6 | 0.5 |
| 7 | 0.397 |
| 8 | 0.315 |
| ... | ... |
| 62 | 0.00000120 |

In practice, each of the quantizing portions 51 to 53 detects the maximum absolute amplitude values of the frequency-domain signals in each block and rounds the values up to the nearest quantized value provided using the amplitude information indexes. In this example, 63 amplitude information indexes are provided. To send the amplitude information, six bits are required.

In this example, the quantization characteristic is linear. Assuming that the magnitude value of a frequency-domain signal is C, the value by the amplitude information is L, and the number of quantization steps is S, with coefficients A and B corresponding to the number of quantization steps S in Table 2, $$[\{A \times (C/L) + B\} \times (S+1)/2/]$$

is calculated. The fragments under decimal point of the result calculated are rounded off and the significant high order N bits are obtained. Thereafter, by inverting the most significant bit of the N bits, a code of the frequency-domain signal is obtained.

TABLE 2

| Relation amony number of quantizing steps S, coefficients A and B, and bits N | | | |
|---|---|---|---|
| Number of Steps S | N | A | B |
| 3 | 2 | 0.75 | −0.25 |
| 7 | 3 | 0.875 | −0.125 |
| 15 | 4 | 0.9375 | −0.0625 |

In a dequantizing portion of a decoding apparatus shown in FIG. 4, the most significant bit of the code is inverted and a result Q is obtained. By calculating $[\{2 \times (Q+1)/S\} \times L\}$, a dequantized signal of the frequency-domain signal can be obtained.

Next, real quantizing and dequantizing processes in an example in which the amplitude values of the frequency-domain signals of one block are 0.10, −0.15, −0.03, 0.20, 0.05, 0.44, 0.05, −0.11, 0.32, −0.40, 0.92, and 0.04 will be described.

In this block, since the maximum amplitude value is 0.92, the nearest amplitude value, 1.0 (amplitude index=3) is selected using Table 1. Corresponding to the above-described calculation, codes obtained in the 15-step quantizing process are 8, 6, 7, 9, 7, 10, 7, 6, 9, 4, 14, and 7. The dequantizing portion dequantizes these codes and obtains 0.133, −0.133, 0.0, 0.267, 0.0, 0.4, 0.0, −0.133, 0.267, −0.400, 0.933, and 0.0.

The 15-step quantizing unit 53 requires four bits for sending a code of one frequency-domain signal. Thus, to send codes of 12 frequency-domain signals of one block, the 15-step quantizing unit 53 requires 48 bits. To send amplitude information, the 15-step quantizing unit 53 also requires six bits. Thus, the 15-step quantizing unit 53 requires a total of 54 bits.

When the quantizing portion selecting portion 4 selects the three-step quantizing portion, codes 1, 1, 1, 1, 1, 2, 1, 1, 1, 0, 2, and 1 are obtained. The dequantized values are 0.0, 0.0, 0.0, 0.0, 0.0, 0.667, 0.0, 0.0, 0.0, −0.677, 0.677, and 0.0.

Thus, the number of bits necessary for sending one block is a total of 30 bits composed of 12 two-bit codes each of which represents a three-level quantized value of each frequency-domain signal and six bits that represent the amplitude information of the block.

As with the dequantizing calculation, the magnitude of the quantizing error is proportional to {(amplitude value L)/(number of quantizing steps S)] of each block. Therefore, as the number of quantizing steps S is increased, the quantizing accuracy of frequency-domain signals can be improved. However, when the number of quantizing steps S is increased, the number of bits N that represent each code is also increased. Thus, the transmission rate increases. consequently, while the quantizing portion selecting portion 4 is adjusting the magnitude of the quantizing error of each frequency-domain signal so that it is proportional to the allowable error defined by the analyzing portion 3, the quantizing portion selecting portion 4 selects a quantizing portion in such a manner that the number of bits necessary for encoding all frequency-domain signals is in a range corresponding to the transmission rate.

The multiplexing portion 6 multiplexes the quantizing portion selection information and an output of a quantizing portion for each block, forms a bit stream, and supplies it through the output terminal 7.

The conventional decoding apparatus is composed of an input terminal 11, a demultiplexing portion 12, a three-step dequantizing portion 81, a seven-step dequantizing portion 82, a 15-step dequantizing portion 83, a signal inverse converting portion 13, and an output terminal 14.

The decoding apparatus receives a multiplexed signal from the input terminal 11. The demultiplexing portion 12 demultiplexes the multiplexed signal into quantizing portion selection information and an output of a quantizing portion. With the quantizing portion selection information, a dequantizing portion corresponding to the quantizing method on the encoding side is selected from the three-step dequantizing portion 81, the seven-step dequantizing portion 82, and the 15-step dequantizing portion 83. Each of the dequantizing portions 81 to 83 separates the output of a quantizing portion into amplitude information and codes of frequency-domain signals. As described above, with the amplitude information, the codes of the frequency-domain signals are dequantized and the frequency-domain signals of each block are reproduced. The signal inverse converting portion 13 inversely converts the frequency-domain signals into a time-domain signal and supplies the resultant signal through the output terminal 14.

In the prior art reference, a quantizing portion that is in common with a block is used. Thus, when the amplitude distribution of the frequency-domain signals is not equal, e.g., when a few of the frequency-domain signals in the block have large projecting amplitudes, such as the eleventh band which has an amplitude value of 0.92 in the sample above, the distribution of quantized codes becomes irregular and the encoding efficiency deteriorates.

SUMMARY OF THE INVENTION

An object of the present invention is to provide a system for converting a sound and speech signal into frequency-domain signals to form blocks and suppressing the number of quantizing bits so as to accomplish high encoding quality even if a few of the frequency-domain signals in the blocks have projecting amplitudes.

The present invention is an encoding system for a speech signal, an audio signal, and so forth, comprising a signal converting portion for converting an input signal into frequency-domain signals and grouping a plurality of frequency-domain signals into blocks, an analyzing portion for analyzing the input signal and the frequency-domain signals and obtaining an allowable error, a selecting portion for outputting selection information for selecting one of a plurality of quantizing portions corresponding to the allowable error, each of the quantizing portions quantizing frequency-domain signals of each block corresponding to the selection information so as to calculate amplitude information and codes, and a multiplexing portion for multiplexing the amplitude information, the codes, and the quantizing portion selection information, wherein said quantizing portions include at least one first quantizing portion for encoding all frequency-domain signals of the blocks and at least one second quantizing portion for encoding only a part of the frequency-domain signals of the blocks.

In one operating mode of the encoding system according to the present invention, outputs of the second quantizing portion are an amplitude information, a polarity code, and a signal index.

In another operating mode of the encoding system according to the present invention, outputs of the second quantizing portion are one representative amplitude information, a plurality of signal indexes, and a plurality of polarity codes.

In the encoding system according to the present invention, in the determination of the part of the frequency-domain signals of the block to be encoded in the second quantizing portion, the signal indexes are previously divided into groups and only one index is selected from each of the groups.

The present invention also provides a decoding system for a speech signal, an audio signal, and so forth, comprising a demultiplexing portion for demultiplexing an input signal into amplitude information, codes, and selection information, a plurality of dequantizing portions for dequantizing the code with the amplitude information corresponding to the selection information, and a signal inverse converting portion for converting a block of output signals of the dequantizing portions, wherein the dequantizing portions include at least one first dequantizing portion for decoding all frequency-domain signals of each block and at least one second dequantizing portion for decoding only part of the frequency-domain signals of each block.

In one operating mode of the decoding system according to the present invention, inputs of the second dequantizing portion are amplitude information, a polarity code, and a signal index.

In another operating mode of the decoding system according to the present invention, inputs of the second dequantizing portion are one representative amplitude information, a plurality of signal indexes, and a plurality of polarity codes.

In the decoding system according to the present invention, the signal indexes are previously divided by the second dequantizing portion and with only one index of each of the groups a frequency-domain signal can be decoded.

Frequency-domain signals with large projecting amplitudes are quantized/dequantized with amplitude information, polarity information, and a signal index.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing an encoding system according to the present invention;

FIG. 4 is a block diagram showing a conventional decoding system.

DETAILED DESCRIPTION OF THE PREFERRED EMBODIMENTS

Figure 2:
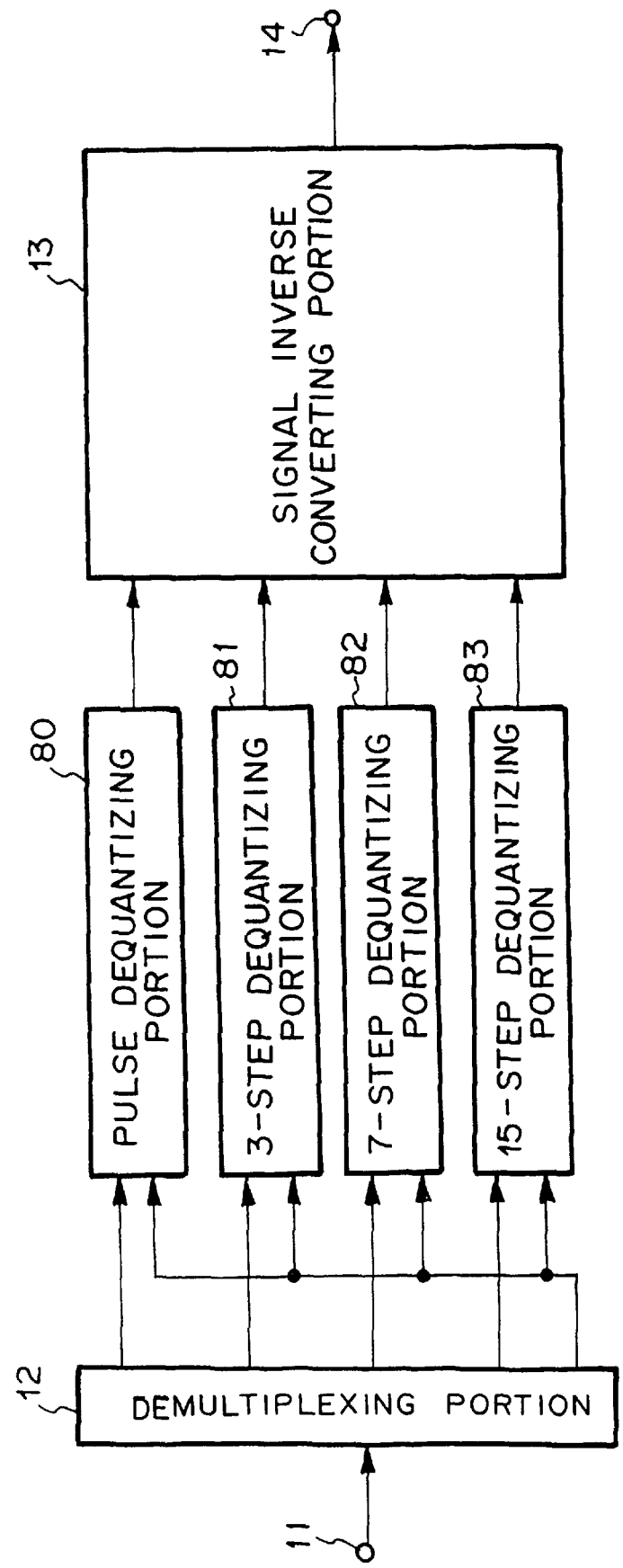
FIG. 2 is a block diagram showing a decoding system according to the present invention.
Figure 3:
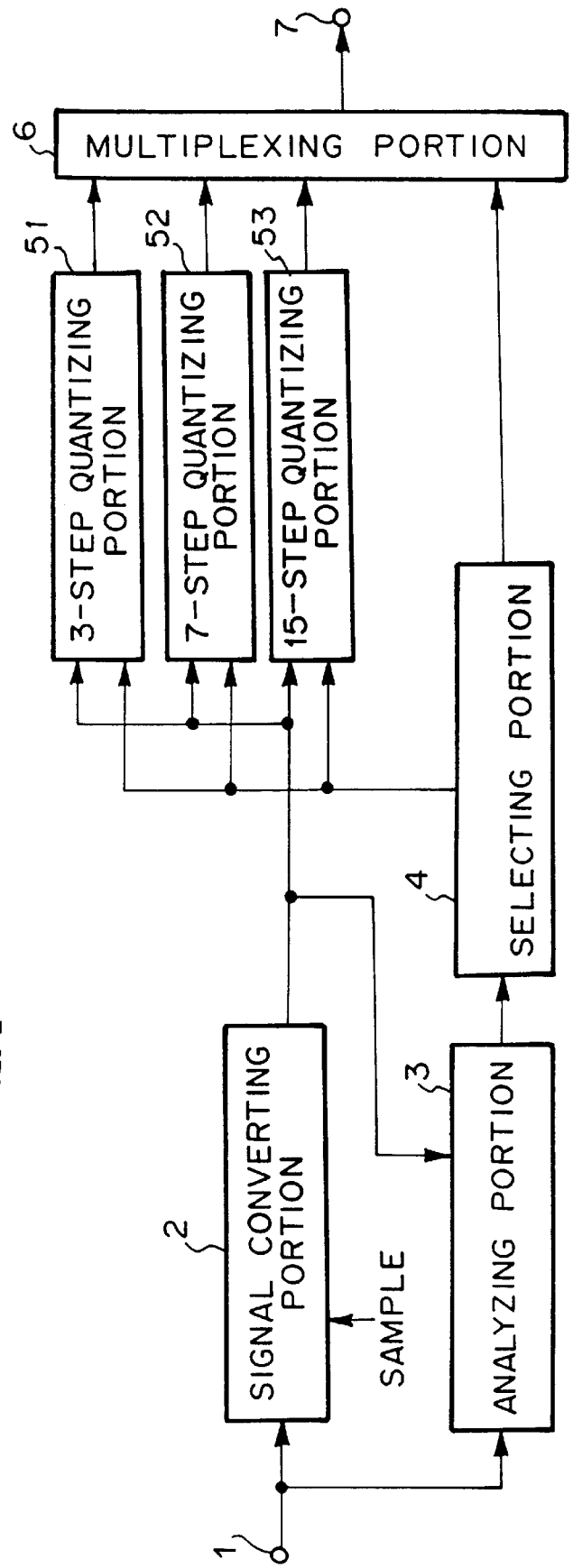
FIG. 3 is a block diagram showing a conventional encoding system.

An embodiment of the present invention will be described with reference to FIGS. 1 and 2. In the embodiment, four types of quantizing portions and four types of dequantizing portions are used. However, it should be noted that the number of types of each of quantizing portions and dequantizing portions are not limited.

An encoding apparatus according to the present invention is composed of an input terminal 1, a signal converting portion 2, an analyzing portion 3, a selecting portion 4, quantizing portions 50 to 53, a multiplexing portion 6, and an output terminal 7. The quantizing portions 50 to 53 are composed of a pulse quantizing portion 50 as well as a three-step quantizing portion 51, a seven-step quantizing portion 52, and a 15-step quantizing portion 53 that are the same as those used in the conventional encoding apparatus.

A digital audio signal, for example PCM audio samples, is supplied from the input terminal 1. Whenever 32 samples of an audio signal are input, the signal converting portion 2 converts a band of the audio signal into 32 frequency-domain signals and stores 12 sets of frequency-domain signals wherein a set of frequency-domain signals is the 32 frequency-domain signals obtained in one conversion. The 12 sets of frequency-domain signals of each frequency compose one block. In the signal converting process, a plurality of converted coefficients with successive frequency indexes may be grouped as a block by Fourier transform or discrete cosine transform instead of the basic dividing process.

The analyzing portion 3 calculates the amount of the allowable error for each frequency using the input audio signal, frequency-domain signals, and so forth in the same manner as the conventional method.

While the selecting portion 4 is adjusting the magnitude of the quantizing error of each frequency-domain signal so that it is proportional to the allowable error defined by the analyzing portion 3, the selecting portion 4 selects a quantizing portion in such a manner that the number of bits necessary for encoding frequency-domain signals of all blocks is in an allowable range corresponding to the transmission rate. The selected quantizing portion encodes the frequency-domain signals of each block as will be described later.

The multiplexing portion 6 multiplexes the quantizing portion selection information and the output of a quantizing portion for each block, forms a bit-stream, and supplies it through the output terminal 7.

A decoding apparatus according to the present invention is composed of an input terminal 11, a demultiplexing portion 12, a pulse dequantizing portion 80, a three-step dequantizing portion 81, a seven-step dequantizing portion 82, a 15-step dequantizing portion 83, a signal inverse converting portion 13, and an output terminal 14.

A multiplexed signal is received from the input terminal 11. The demultiplexing portion 12 demultiplexes the received signal into the selection information and an output of a quantizing portion. With the selection information, a dequantizing portion corresponding to the quantizing method on the encoding side is selected from the pulse dequantizing portion 80, the three-step dequantizing portion 81, the seven-step dequantizing portion 82, and the 15-step dequantizing portion 83. As will be described later, the selected dequantizing portion reproduces frequency-domain signals of each block corresponding to the input of the quantizing portion. The signal inverse converting portion 13 inversely converts the frequency-domain signals into a time-domain signal and supplies the resultant signal through the output terminal 14.

Next, several examples of the quantizing process and the dequantizing process according to the present invention will be described.

As a first example, when frequency-domain signals of each block are encoded, the pulse quantizing portion 50 encodes frequency-domain signals with large projecting amplitude values. The conventional quantizing portions encode other frequency-domain signals. In the example discussed above using the system disclosed in the prior art reference in conjunction with Table 1, the 15-step quantizing portion quantized the 11th band having an amplitude value of 0.92 along with the other values in the set. Because this value projects above the other values in the set, however, the pulse quantizing portion 50 would quantize this 11th sub-band signal according to the system of the present invention, while the conventional quantizing portion would quantizes the other frequency-domain signals in the set, with amplitude values of 0.10, −0.15, −0.03, 0.20, 0.05, 0.44, 0.05, −0.11, 0.32, −0.40, and 0.04.

The pulse quantizing portion 50 calculates the amplitude value, the polarity, and the signal index indicating the position of one subband signal in the set, and outputs the calculated information. In the example above where the pulse quantizing portion 50 processes the frequency-domain signal with an amplitude value 0.92, using the amplitude information shown in Table 1, the pulse quantizing portion 50 outputs amplitude information 1.0 (amplitude index=3) and polarity information positive. Since the frequency-domain signal with the amplitude value 0.92 is placed at the 11th position of the block, the signal index information is 11. Thus, the output of the pulse quantizing portion 50 requires six bits for the amplitude information, one bit for the polarity information, and four bits for the signal index information that identifies a position among the 12 signals of the block.

Since frequency-domain signals with large projecting amplitude values are excluded from the calculations of the conventional quantizing portions, the maximum absolute amplitude value of the remaining frequency-domain signals is decreased from 0.92 to 0.44. Thus, the amplitude information of these frequency-domain signals become 0.5 (index= 6). Because the quantizing error is proportional to [(amplitude value L)/(number of quantizing steps S)} of each block, when the frequency-domain signals are quantized with a similar quantizing error as those of the 15-step quantizing portion, the number of quantizing steps required can be decreased from 15 to 7. Therefore, the number of bits necessary for sending each code can be decreased from 4 to 3. The seven-step quantizing portion quantizes the 11 sub-band signals and obtains the codes of 4, 2, 3, 4, 3, 6, 3, 2, 5, 0, and 3. On the decoding side, the seven-step dequantizing portion 82 decodes these codes and obtains the reproduced frequency-domain signals of 0.143, −0.143, 0.0, 0.143, 0.0, 0.329, 0.0., −0.143, 0.2886, −0.429, and 0.0.

Finally, according to the present invention, as shown in Table 3, with a total of 50 bits, codes of all frequency-domain signals of one block can be sent. In comparison with the 54 bits required to send the codes of one block in the prior art reference, the number of bits required can be decreased by four bits.

TABLE 3

| Bit assignment | | |
|---|---|---|
| Item | | Number of Bits |
| Quantizing signal with Large Amplitude Value | Amplitude information Polarity Signal Index | 6 1 4 |
| Quantizing Other signals | Amplitude information Code | 6 33 |
| Total | | 50 |

Next, in the case where the number of quantizing steps is 3, the pulse quantizing process and the pulse dequantizing process will be described using the example input signal of the related art reference.

When the number of quantizing steps is three, the amplitude values-of quantized frequency-domain signals are "0" and "±" (the same or negative values of the value indicated by the amplitude information). In other words, when pulses with negative and positive amplitude values are disposed with a center of "0", frequency-domain signals of the block can be represented. Information to be sent is amplitude information associated with the frequency-domain signals of the block, a signal index of each frequency-domain signal imitated with a pulse, and a polarity code.

In the example input signal above, since frequency-domain signals of a block can be imitated with three pulses, a bit assignment is shown in Table 4 where the number of frequency-domain signals represented in one block is limited to four. Since the frequency-domain signals imitated with pulses are signals 6 (0.44), 10 (−0.40), and 11 (0.92), information 6, 10, and 11 are encoded as signal indexes. The polarities of these codes are positive, negative, and positive. As amplitude information, 1.0 (index=3) as the maximum absolute amplitude value or 0.630 (index=5) as the average of the absolute amplitude values of three frequency-domain signals to be imitated is used.

TABLE 4

| Bit assignment | | |
|---|---|---|
| Item | | Number of Bits |
| Amplitude Information | | 6 |
| Number information of frequency-domain signals to be encoded | | 2 |
| Quantizing first sample | Polarity signal index | 1 4 |
| Quanitizing second sample | Polarity signal index | 1 4 |
| Quantizing third sample | Polarity signal index | 1 4 |

The number of bits for the amplitude information, the signal index, and the polarity code are six, four, and one, respectively. Thus, a total number of bits required for one block is 23, which is smaller than the 30 bits required in the prior art reference.

When the number of bits of number information of frequency-domain signals to be encoded is varied to one, two, three, or four, up to two, four, eight, and 16 frequency-domain signals within a block can be imitated. Assuming that the number of frequency-domain signals to be imitated is M and the number of bits for number information of frequency-domain signals to be encoded is N (N=1 to 4), the number of bits required can be expressed by 6+N+M×(4+1). Thus, when the number of frequency-domain signals represented in ne frame is limited to four, in comparison with the prior art reference where the three-step quantizing process is used, the number of bits required is always decreased.

In the case where the pulse quantizing process and the pulse dequantizing process are used, when the selection of frequency-domain signals to be encoded is restricted, the number of bits can be decreased. For example, the 12 frequency-domain signals of one block are divided into three groups and only one frequency-domain signal of each group is encoded. In an exemplary grouping method, the first, fourth, seventh, and tenth frequency-domain signals are assigned to the first group. The second, fifth, eighth, and eleventh frequency-domain signals are assigned to the second group. The third, sixth, ninth, and twelfth frequency-domain signals are assigned to the third group. As a criterion for selecting one frequency-domain signal from each group, an amplitude value is used.

In the example of frequency-domain signals used above, the frequency-domain signal with the largest absolute amplitude value of the first group is the tenth frequency-domain signal (−0.40). The frequency-domain signal with the largest absolute amplitude value of the second group is the eleventh frequency-domain signal (0.92). The frequency-domain signal with the largest absolute amplitude value of the third group is the sixth frequency-domain signal (0.44). Among the frequency-domain signals assigned to the individual groups, the second frequency-domain signal, the fourth frequency-domain signal, and the second frequency-domain signal of each group have the largest amplitude values. Thus, when 3, 4, and 2 are the signal indexes of the selected frequency-domain signals and negative, positive, and positive are the polarity information sent in addition to the amplitude information, the frequency-domain signals can be reproduced on the decoding side. As with the above-described example, the amplitude value of 1.0 (amplitude index=3), based on the maximum absolute amplitude value, or 0.630 (index=5), based on the average value of the absolute amplitude values of three frequency-domain signals to be imitated is selected.

The number of bits necessary for sending frequency-domain signals of one block is six bits for the amplitude information of the block, two bits for a signal index for selecting one of four frequency-domain signals, and one bit for representing the polarity of the amplitude of the selected frequency-domain signal as shown in Table 5. Thus, since a total of 15 bits are used, the number of bits required is decreased in comparison with the above-described embodiment.

TABLE 5

Bit assessment

| Item | | Number of bits |
|---|---|---|
| Amplitude information | | 6 |
| Quantizing frequency-domain signals of first group | Polarity | 1 |
| | index | 2 |
| Quantizing frequency-domain signals of second group | Polarity | 1 |
| | index | 2 |
| Quantizing frequency-domain signals of third group | Polarity | 1 |
| | index | 2 |

In another exemplary method for grouping frequency-domain signals of one block, the first, second, third and fourth signals may be assigned to the first group. The fifth, sixth, seventh, and eighth signals may be assigned to the second group. The ninth, tenth, eleventh, and twelfth frequency-domain signals may be assigned to the third group.

In the above-described embodiment, an audio signal was exemplified. However, it should be noted that a video signal with a projecting luminance or an extreme color may be handled with a pulse quantizing portion and a pulse dequantizing portion so as to decrease the total number of bits.

With a pulse quantizing portion 50 and a pulse quantizing portion 80 that can encode and decode part of frequency-domain signals of a block, the number of bits necessary for the quantizing process can be decreased. Thus, for a signal source with a larger projecting amplitude than other signals in a block, the same encoding quality as the conventional method can be accomplished with a smaller number of bits than the conventional method. Consequently, the encoding efficiency can be improved.

Although the present invention has been shown and described with respect to a best mode embodiment thereof, it should be understood by those skilled in the art that the foregoing and various other changes, omissions, and addition in the form and detail thereof may be made therein without departing from the spirit and scope of the present invention.

What is claimed is:

1. An encoding system for signals, comprising:
   a signal converting portion for converting an input signal into a plurality of frequency-domain signals and grouping the frequency-domain signals into blocks;
   an analyzing portion for analyzing the input signal and the frequency-domain signals and obtaining an allowable error;
   a plurality of quantizing portions for quantizing the frequency-domain signals of each block to calculate amplitude information and codes for each block;
   a selecting portion for selecting one of said plurality of quantizing portions corresponding to the allowable error and for outputting a quantizing portion selection information; and
   a multiplexing portion for multiplexing the amplitude information, the codes, and the quantizing portion selection information,
   wherein said quantizing portions include at least one first quantizing portion for encoding only frequency-domain signals in the blocks which have projecting amplitudes relative to the other frequency-domain signals in the blocks and at least one second quantizing portion for encoding the remainder of the frequency-domain signals in the blocks which are not encoded in the at least one first quantizing portion.

2. The encoding system as set forth in claim 1,
   wherein outputs of the first quantizing portion include an amplitude information, a polarity code, and a frequency index for each block.

3. The encoding system as set forth in claim 1,
   wherein outputs of the first quantizing portion are one representative amplitude, a plurality of frequency indexes, and a plurality of polarity codes for each block.

4. The encoding system as set forth in claim 3, wherein in the determination of which of the frequency-domain signals of each block is to be encoded by the first quantizing portion, the frequency indexes are divided into groups and only one index is selected from each of the groups.

5. A decoding system for signals, comprising:
   a demultiplexing portion for demultiplexing input signals into amplitude information, codes, and quantizing portion selection information;
   a plurality of dequantizing portions for dequantizing the codes with the amplitude information corresponding to the quantizing portion selection information; and
   a signal inverse converting portion for converting blocks of output frequency-domain signals from said dequantizing portions,
   wherein said dequantizing portions include at least one first dequantizing portion for decoding only frequency-domain signals in each block which have projecting amplitudes relative to the other frequency-domain signals in each block and at least one second deguantizing portion for decoding the remainder of the frequency-domain signals in each block which are not decoded in the at least one first dequantizing portion.

6. The decoding system as set forth in claim 5,
   wherein inputs to the first dequantizing portion include an amplitude, a polarity code, and a frequency index for each block.

7. The decoding system as set forth in claim 5,
   wherein inputs to the first quantizing portion are one representative amplitude information, a plurality of frequency indexes, and a plurality of polarity codes for each block.

8. The decoding system as set forth in claim 7,
   wherein the frequency indexes of each block are divided into groups in the first dequantizing portion and the frequency-domain signals of said each block can be decoded using only one frequency index from each of the groups.

9. The encoding system as set forth in claim 1, wherein the first quantizing portion is a pulse quantizing portion.

10. The decoding system as set forth in claim 5, wherein the first dequantizing portion is a pulse dequantizing portion.

11. An encoding system for signals, comprising:

a signal converting portion for converting an input signal into a plurality of frequency-domain signals and grouping the frequency-domain signals into blocks;

an analyzing portion for analyzing the input signal and the frequency-domain signals and obtaining an allowable error;

plurality of quantizing portions for quantizing the frequency-domain signals of each block to calculate amplitude information and codes for each block;

a selecting portion for selecting one of said plurality of quantizing portions corresponding to the allowable error and for outputting a quantizing portion selection; and a multiplexing portion for multiplexing the amplitude information, the codes, and the quantizing portion selection information, wherein said quantizing portions include at least one pulse quantizing portion for encoding only part of the frequency-domain signals in each block and at least one step quantizing portion for encoding the remainder of the frequency-domain signals in each block which are not encoded in the at least one pulse quantizing portion.

12. The encoding system as set forth in claim 11, wherein outputs of the pulse quantizing portion include an amplitude, a polarity code, and a frequency index for each block.

13. The encoding system as set forth in claim 11, wherein the part of the frequency-domain signals in each block encoded by the at least one pulse quantizing portion is determined on the basis of amplitude values of the signals.

14. A decoding system for signals, comprising:

a demultiplexing portion for demultiplexing input signals into amplitude information, codes, and quantizing portion selection information;

a plurality of dequantizing portions for dequantizing the codes with the amplitude information corresponding to the quantizing portion selection information; and a signal inverse converting portion for converting a block of output frequency-domain signals from said dequantizing portions, wherein said dequantizing portions include at least one pulse dequantizing portion for decoding only part of the frequency-domain signals in each block and at least one step dequantizing portion for decoding the remainder of the frequency-domain signals in each block which are not decoded in the at least one pulse dequantizing portion.

15. The decoding system as set forth in claim 14, wherein inputs to the second dequantizing portion include an amplitude, a polarity code, and a frequency index for each block.

16. The encoding system as set forth in claim 14, wherein the part of the frequency-domain signals in each block encoded by the at least one pulse quantizing portion is determined on the basis of amplitude values of the signals.

* * * * *